United States Patent Office 3,526,828
Patented Sept. 1, 1970

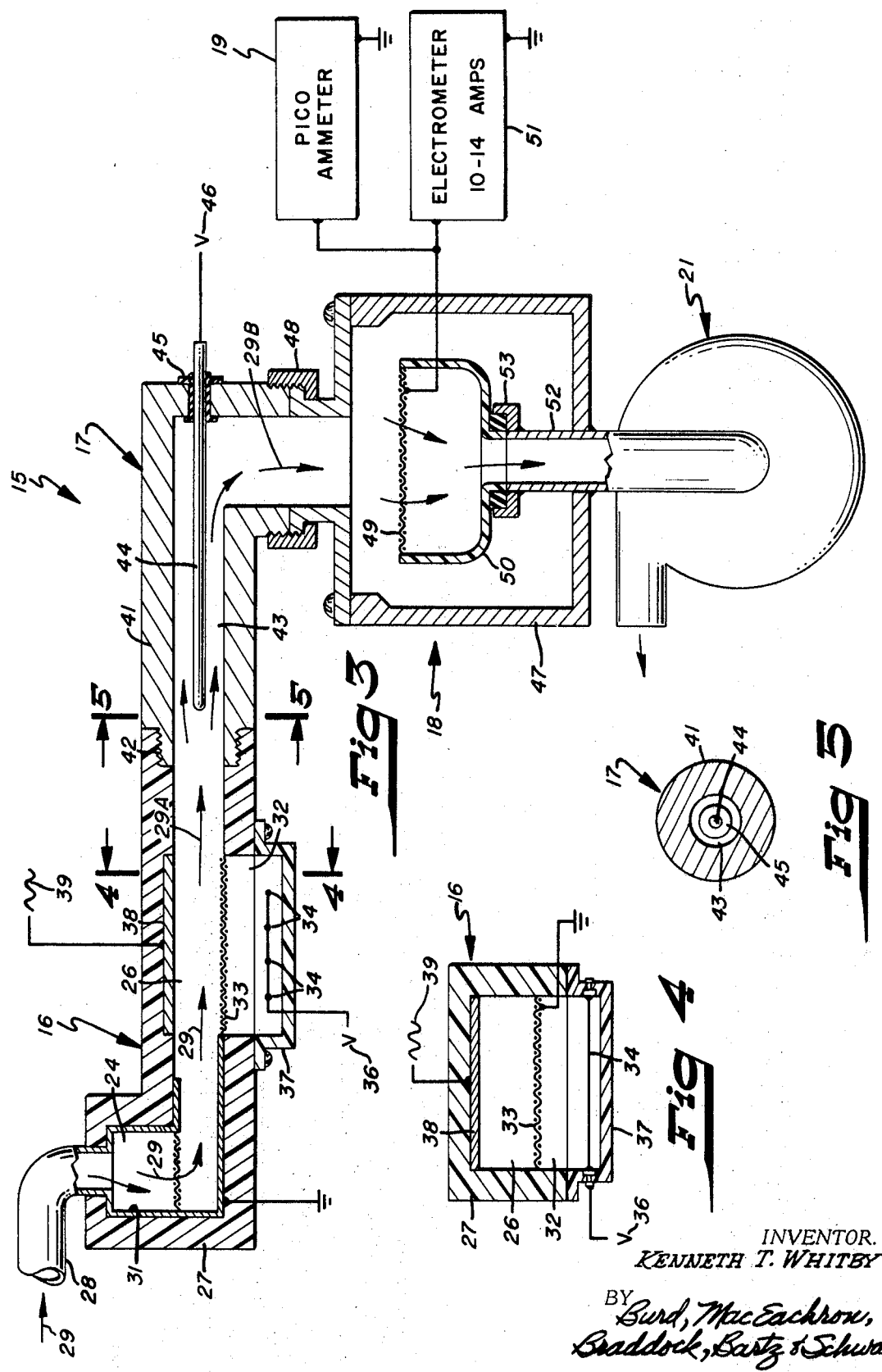

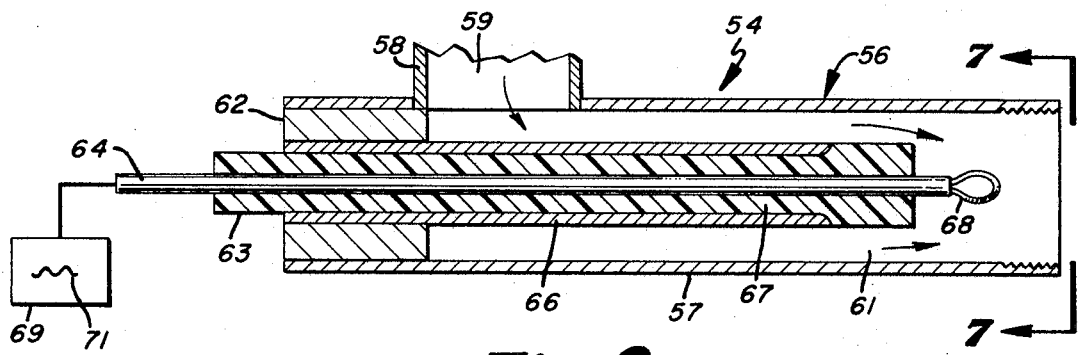
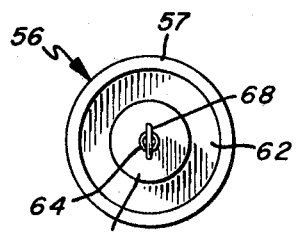
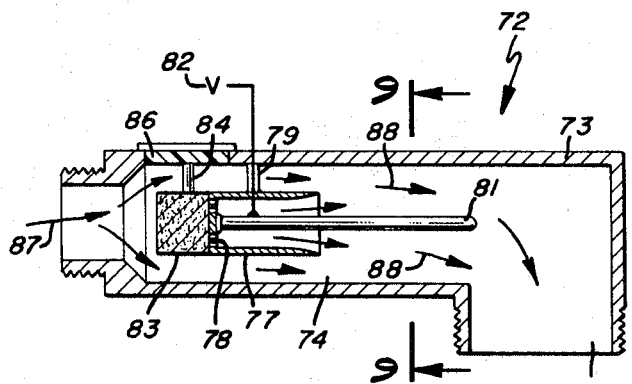
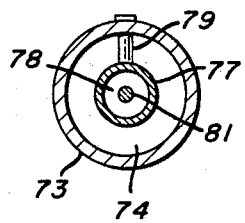

3,526,828
METHOD AND APPARATUS FOR MEASURING PARTICLE CONCENTRATION
Kenneth T. Whitby, Minneapolis, Minn., assignor to Regents of The University of Minnesota, Minneapolis, Minn., a corporation of Minnesota
Filed Aug. 7, 1967, Ser. No. 658,833
Int. Cl. G01n 27/62
U.S. Cl. 324—33                                22 Claims

ABSTRACT OF THE DISCLOSURE

A method and instrument for electric measurement of aerosol particle mass concentrations of a self preserving aerosol size distribution. The instrument has a charger to unipolarly charge a collected sample of aerosol particles in a low electric field, a mobility separator to remove charged aerosol particles smaller than 0.05 micron radius by passing the charged particles through a weak electric field; and a current collector to collect the remaining charged large particles. The mass concentration of the large charged aerosol particles is directly proportional to the electric current gathered by the current collector.

BACKGROUND OF INVENTION

One of the first electrical aerosol concentration meters proposed by von Schweidler in 1918 consisted of a cylindrical chamber with a sufficient amount of radioactive material on the inner wall of the chamber so that a small ion current flows to an inner electrode field at a different potential than the wall. When an aerosol is passed through the chamber, ions captured by the aerosol reduce the ion current because the lower mobility charged particles are swept out of the chamber by airflow. This ion capture principle has also been used to measure small concentrations of certain gases by reacting the gases to form aerosols. In another electrical aerosol concentration meter the current resulting from impact of the aerosol particles against an electrode connected to an electrometer is used to measure the areosol concentration. Work has been done in charging the aerosol in an electric corona and then measuring the charge density downstream with a radioactive probe connected to an electrometer. The aerosol measuring instrument and method of this invention is a portable and quick response electrical meter capable of measuring urban aerosol mass concentrations where the aerosol size distribution is of a self preserving form.

SUMMARY OF INVENTION

In the past decade evidence has accumulated that the size distribution functions of atmospheric aerosols follow the general form that a change in the charging ion concentration is proportional to the aerosol particle radius over the size range from approximately 0.05 to 5 micron radius. The general form is $dN/dr$ proportional to $r^{-4}$. In general, the number of unit charges acquired by an aerosol particle is a function of the radius of the particle with the smaller particles contributing to a large and erratic charge. The method and apparatus of the invention utilizes this principle by classifying out or removing the smaller particles, that is, particles having a radius of smaller than 0.05 micron, so that they do not contribute to the charge. With the smaller particles removed the total charge will be directly proportional to aerosol mass concentration. By collecting and reading the charge on a current collector a direct relationship to the aerosol mass concentration for constant aerosol particle density is obtained. A unipolar charger is used in combination with an electric mobility separator to remove all the aerosol particles smaller than a given radius and to pass the larger particles to a current collector. The current accumulated at the current collector will be directly proportional to the aerosol particle mass concentration.

Figure 1:
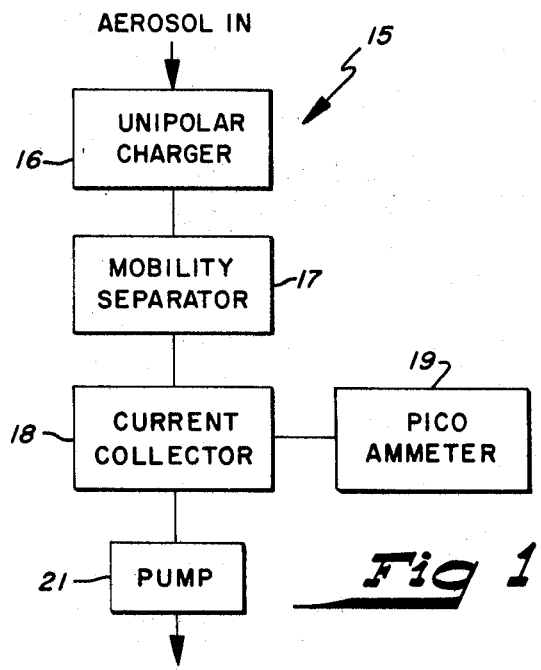
Figure 2:
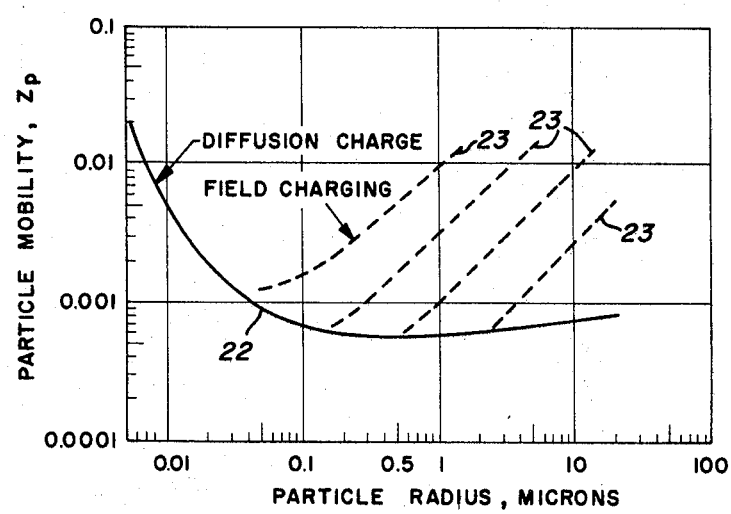

In the drawings:
FIG. 1 is a schematic block diagram of the electrical aerosol mass concentration meter of the invention;
FIG. 2 is a graph showing electric particle mobility for field charging and diffusion charging;
FIG. 3 is a longitudinal sectional view of one modification of the electrical aerosol mass concentration meter of the invention;
FIG. 4 is an enlarged sectional view taken along the line 4—4 of FIG. 3;
FIG. 5 is an enlarged sectional view taken along the line 5—5 of FIG. 3;
FIG. 6 is a longitudinal sectional view of another field charger usable in the meter of FIG. 3;
FIG. 7 is an enlarged sectional view taken along the line 7—7 of FIG. 6;
FIG. 8 is a longitudinal sectional view of another mobility separator usable with the meter of FIG. 3; and
FIG. 9 is an enlarged sectional view taken along the line 9—9 of FIG. 8.

Referring to the drawings, there is shown in FIG. 1 a schematic block diagram of the electrical aerosol mass concentration meter of this invention indicated generally at 15. Meter 15 has a unipolar charger 16 operable to impart a unipolar electrical charger on aerosol particles moving through the charger. The charged aerosol particles from charger 16 are directed through a mobility separator 17 to remove the smaller charged aerosol particles, as aerosol particles smaller than a selected size, as 0.05 micron radius. The large particles are directed to a current collector 18 which collects the large charge particles providing a current readable on a pico ammeter 19. The current collected is directly proportional to the aerosol particle mass concentration. The flow of air carrying aerosol particles through the meter is achieved by a pump 21 operable to pull a continuous and uniform sample of the aerosol particles and air through the meter.

In theory the mass of an aerosol particle is proportional to the cube of its radius, $r^3$. In the following discussion the following symbols are used.

$n_p$ = number of unit charges acquired by the aerosol particle
$r$ = particle radius-microns
$r_1$ = minimum or selected particle size
$N$ = charging ion concentration
$t$ = charging time
$Z_p$ = particle mobility
$E$ = charging field There is at this time no practical way of charging an aerosol particle so that its charge is proportional to the cube of its radius. It has been determined that the size distribution functions of atmospheric aerosol follows the form that the change in the charging ion concentration and particle radius is proportional to $r^{-4}$ over the size range of aerosol particles having a radius from approximately greater than 0.05 micron and smaller than 5 microns. When the charged aerosol particles smaller than $r_1$ are removed by the mobility separator 17 they do not contribute to the total charge measured by the current collector. The readings from the pico ammeter will be directly proportional to aerosol particle mass concentration providing that the aerosol particle density is independent of $r$.

Referring to the graph of FIG. 2 there is shown electric particle mobility, $Z_p$, for both field charging and diffusion charging. The curve 22 is a calculated plot of the electric particle mobility, $Z_p$, for unipolar diffusion charging for a given charging ion concentration and time, $N_p t$. The mobility is relatively constant for particles having a radius greater than 0.5 micron but increases rapidly for particles having a radius smaller than 0.1 micron. For field charging shown by curves 23 the mobility of the particles increase approximately linearly with particle radius for $r$ greater than the size corresponding to a diffusion charge. For a large electric field, E, the minimum mobility is increased and occurs at a smaller $r$. The relationships between the mobility and the radius of the particle shown in FIG. 2 shows that if unipolar diffusion or low unipolar field charging is used then the particles smaller than $r_1$ can be removed by an electric mobility separator designed to separate the smaller particles from the larger particles. From FIG. 2 it can be seen that field charging with E above 1000 volts is undesirable because removal of the small high mobility aerosol particles will also remove the large mobility particles. Low field charging, E smaller than 1000 volts, will give total currents almost identical to those for diffusion charging.

Referring to FIG. 3, there is shown an example of the structure of the aerosol concentration meter 15 with the charger 16 connected in line with the mobility separator 17. The outlet of mobility separator 17 is coupled to the current collector 18 so that aerosol particles and air is drawn through the charger, the mobility separator, and the current collector 18 by pump 21.

Charger 16 is a field charger having an inlet region 24 and a charging region 26 forming a passage in a housing 27. The inlet region 24 is open to an inlet conduit 28 used to transport the aerosol particles indicated by arrows 29 into the charger. Conduit 28 may be connected directly to a probe or a probe connected to a diluter used to reduce the temperature and humidity of the aerosol. The inlet region 24 has a grounded metal wall 31 to minimize the accumulation of aerosol particles on the walls. As shown in FIGS. 3 and 4, housing 27 has an opening 32 covered with a grounded screen 33. Extended below screen 33 are a plurality of wires 34, as tungsten wires, connected to a power supply 36 to apply a voltage V to wires 34 On the application of between 3,000 to 4,000 volts DC to wires 34, corona is established in the area between the wires 34 and the screen 33 so that a constant supply of ions are emitted and flow toward the screen.

Located above screen 33 on the opposite wall of housing 27 is a charging electrode or plate 38 connected to an AC charging voltage 39. The ions below screen 33 are drawn into charging region 26 by the application of a low AC voltage 39. For example, 300 to 400 volts AC in the form of a 60 c.p.s. sign wave is sufficient to draw ions into charging region 26. In this manner, the aerosol particles are unipolarly charged in a low electric field without collecting or precipitating the particles. The charged aerosol particles indicated by the arrows 29A flow from the charger into the mobility separator 17.

The mobility separator 17 comprises a tubular housing 41 secured to the end of the charger housing 27 by a threaded connection coupling 42 so that the elongated passage of the separator is in alignment with the discharged outlet of the charger and the charger passage 26. Located longitudinally in the center of passage 43 is an electrode rod 44. An insulated mount 45 secures rod 44 to the end wall of housing 41 and provides a connection to a power supply 46 to apply a voltage V to rod 44. The mobility separator 17 is a cylindrical condenser having a single laminar flow of aerosol particles and air through passage 43. On the application of approximately 2,000 volts DC to the electrode rod 44 the small charged particles are precipitated or collected on the rod 44 while the large particles indicated by arrows 29B flow into the current collector. Particles having a radius smaller than 0.05 mircon are precipitated out or condensed on the electrode rod 44.

Current collector 18 comprises a housing 47 attached to the outlet portion of the mobility separator 17 by a connector 48. Housing 47 encloses a chamber for a readily removable filter 49. The housing is a two part structure so that it can be readily opened for removing and replacing the filter. A quick opening door (not shown) may be associated with the housing 47 to provide entry into the chamber for removing filter 49. Filter 49 is of a type that can be weighable and may be of different types and sizes. The filter is held in a facing relation with respect to the charged particles by a support 50 removably attached to a tubular member 52. Tubular member 52 extends through housing 47 to the inlet of pump 21 so that the aerosol and air in the meter 15 flows through the filter. A releasable and insulative connector 53 attaches the support 50 to member 52. The filter 49 is connected to an electrometer 51 and the pico ammeter 19 so that the current collected on filter 49 is read as a function of the ammeter reading.

In use and in terms of method the electric aerosol mass concentration meter 15 provides a measurement of aerosol particle mass concentration by initially collecting a sample of the aerosol particles and directing the sample into the charger. The sample collected may have a concentration range from clean atmospheric air to moderate stack loads. The aerosol flows through inlet region 24 of the charger into the charging region 26. At this time a unipolar electric charge is imparted on the aerosol particles flowing through region 26. The application of voltage 39 to the charging plate 38 draws ions through the screen 33 imparting a unipolar electric charge on the aerosol as it flows through the charger. The charged aerosol indicated by arrows 29A leaves the charger and enters the mobility separator 17 where they are subjected to a weak electric field by the voltage applied to the rod 44. The smaller highly mobile and erratic charged particles will precipitate out on the rod 44 leaving the particles larger than a particular size preferably 0.05 micron radius. The amount of voltage applied to the rod 44 determines the size range of small particles which are precipitated out on the rod 44.

The selected sized particles and larger particles indicated by arrows 29B are directed onto filter 49 where the charge on these particles is collected. The charge on the collected particles measured by the pico ammeter 19 provides a reading determinative of the aerosol particle mass concentration of a self preserving aerosol size distribution.

Referring to FIGS. 6 and 7 of the drawing, there is shown a field charger indicated generally at 54 which may be used to unipolarly charge the aerosol particles without collecting or precipitating the aerosol particles. Charger 54 may be used in place of charger 16 in the meter shown in FIG. 3. Charger 54 has a body indicated generally at 56 comprised of angularly related tubular members 57 and 58. Member 58 has an inlet connectable to a sampling probe for directing aerosol to a charging passage 61 formed by tubular member 57. One end of charging passage 61 is closed with a collar 62 slidably supporting a cylindrical member 63 carrying a longitudinal electrode rod 64. Cylindrical member 63 has a peripheral metal tube 66 surrounding a non-conductive core 67. The electrode rod 64 extends longitudinally through the core 67. The forward end of rod 64 is secured to a looped corona wire 68. The corona wire 68 is a fine wire having a loop-shape capable of taking large electric currents. For example, the wire 68 may be a tungsten wire of 0.0025 cm. diameter. The opposite end of rod 64 is electrically coupled to a power source 69 capable of generating a charging voltage 71. An example of charging voltage 71 is an AC voltage sufficient to accomplish corona in the area of wire loop 68. By subjecting the AC voltage to a DC bias it is possible to cause a pulsed or intermittent corona in a relatively low field.

Another charger which may be used with a meter of FIG. 3 is a diffusion charger. An example of a diffusion charger is shown in FIG. 2 of my U.S. Pat. No. 3,413,545.

This charger has a sonic jet ionizer which discharges a stream of gas ions which are mixed with the aerosol particles to impart an electrical charge on the aerosol particles. Unipolar charging of the aerosol particles is accomplished by exposing them to unipolar small ions in a charging chamber having an outlet which can be connected to a mobility separator.

Referring to FIGS. 8 and 9, there is shown a modification of the mobility separator indicated generally at 72. Mobility separator 72 is a two-flow device in that it taps off by the use of a filter 83 some of the aerosol flow providing a clean air sheath around the particle collection electrode rod 81. Separator 72 comprises a tubular body 73 having a passage 74 and an outlet 76. Longitudinally located in passage 74 is a longitudinal cylindrical cup member 77 having a porous upright forward wall 78. A support 79 which minimizes turbulence of the flowing aerosol connects cup member 77 to body 73. Projected longitudinally in a rearward direction from wall 78 is an electrode rod 81 used to collect the small mobile charged aerosol particles. Rod 81 is coupled to a power source 82 used to supply voltage to rod 81 to precipitate the small aerosol particles.

Located forwardly of wall 78 is a removable filter 83 mounted on a support 84. The support is secured to a removable door 86 making the filter 83 readily removable from the separator for purposes of cleaning, replacement or repair. The charged aerosol particles indicated by arrow 87 enter passage 74 with part of the air flowing through the filter 83 and some of the aerosol particles are collected on the filter. The remaining aerosol particles form a cylindrical band or annular core about the cup-shaped member 77. The air flowing through cup-shaped member indicated by arrows 88 surrounds the electrode rod 81 forming a cylindrical air barrier or sheath which confines the charged aerosol particles to an annular cylinder adjacent the inner cylindrical wall of body 73. The sheath of air indicated by arrows 88 makes the cut-off size of the aerosol particles collected on rod 81 relatively abrupt. In operation the cylindrical sheath of air provides a clear particle size line between the smaller highly mobile particles which are collected on the electrode rod 81 and the larger aerosol particles which are directed through the mobility separator to the current collector.

This invention is based at least in part upon work done under a contract or grant from the United States Government.

The embodiments of the invention in which an exclusive property or privilege is claimed are defined as follows:

1. A method for electric measurement of aerosol particle mass concentration comprising: directing a continuous stream of aerosol particles through a charger, generating a continuous supply of unipolar ions, imparting a unipolar electric charge on the aerosol particles as they flow through the charger without precipitating the aerosol particles with said unipolar ions periodically drawn into the stream of aerosol particles by a separate alternating low electric field established with an AC charging voltage, removing aerosol particles smaller than a selected size downstream from the charger, collecting the charged particles larger than said selected size, and measuring the electric charge of the collected charged particles to determine aerosol particle mass concentration.

2. The method of claim 1 wherein the aerosol particles are directed to the charger by drawing the aerosol particles and air through the charger.

3. The method of claim 1 wherein a portion of the charged aerosol particles are filtered from the stream of particles prior to the collecting of selected sized charged particles.

4. The method of claim 1 wherein the charged electric aerosol particles are subjected to an electric field to remove the aerosol particles smaller than a selected size.

5. The method of claim 1 wherein the charged electric aerosol particles are subjected to an electric field sufficient to precipitate aerosol particles having a radius smaller than 0.05 micron.

6. A method for electric measurement of aerosol particles mass concentration comprising: directing a stream of aerosol particles through a charger, imparting a unipolar electric charge on the aerosol particles as they flow through the charger without precipitating the aerosol particles, filtering a portion of the charged aerosol particles from the stream of charged aerosol particles to establish a clean core of air around a particle collector, depositing charged aerosol particles smaller than a selected size on the collector, collecting the charged particles larger than said selected size, and measuring the electric charge of the collected charged particles to determine aerosol particle mass concentration.

7. The method of claim 6 wherein unipolar ions are drawn into a stream of aerosol particles by an alternating low electric field to impart a unipolar charge of the aerosol particles.

8. The method of claim 6 wherein the unipolar electric charge is imparted on the aerosol particles by unipolar diffusion charging.

9. An apparatus for measuring aerosol particle concentration of an aerosol comprising: a charge having a charging passage and means for imparting a unipolar electric charge to aerosol particles moving through the charging pasage without precipitating the aerosol particles, a particle separator attached to the charger, said separator having a separator passage in communication with the charger passage and means in the separator passage operable to electrically precipitate charged aerosol particles smaller than a selected particle size, a charged particle collector for receiving the charged particles larger than the selected size, said collector having first means including a removable filter for gathering the charged particles and second means for measuring the electric charge of the gathered charged particles to determine aerosol particle mass concentration, and means for moving a sample of aerosol particles through the charger and separator into the collector.

10. The apparatus of claim 8 wherein said charger is a field charger having means generating a continuous supply of ions and charging electrode means for drawing ions into the sample of aerosol particles moving through the charger.

11. The apparatus of claim 10 including a screen between the means generating a continuous supply of ions and a plate comprising the charging electrode means, said screen and plate located on opposite sides of the charging passage.

12. The apparatus of claim 10 including a power source for applying an AC voltage to the charging electrode means.

13. The apparatus of claim 9 wherein said charger has a looped wire located in the charging passage and means for applying a voltage to the looped wire to establish a corona whereby ions are discharged into the sample of aerosol particles moving through the charger.

14. The apparatus of claim 9 wherein the means in the separator passage is operable to precipitate charged aerosol particles having a radius smaller than 0.05 micron.

15. The apparatus of claim 9 wherein the means of the separator is an electrode rod extended along the longitudinal axis of the separator passage and a power supply connected to the electrode rod operable to provide the electrode rod with a voltage sufficient to precipitate charged aerosol particles smaller than the selected size.

16. The apparatus of claim 15 including means for forming a sheath of moving clean air around said electrode rod.

17. The apparatus of claim 16 wherein said means for forming a sheath of moving clean air includes a cup-shaped member located in the separator passage for directing the charged aerosol particles in an annular core around the sheath of air surrounding the electrode rod.

18. The apparatus of claim 17 wherein said filter is removably mounted in front of said cup-shaped member.

19. The apparatus of claim 9 wherein the second means of the collector includes an electrometer and pico ammeter.

20. In an apparatus for measuring aerosol particles concentration of an aerosol: a charger having a charging passage and means for imparting a unipolar electric charge to aerosol particles moving through the charging passage without precipitating the aerosol particles, said charger including means generating a continuous supply of unipolar ions, charging electrode means spaced from said ion generating means for drawing unipolar ions into the stream of aerosol particles moving through the charging passage, a porous means between the ion generating means and the electrode means, said electrode means comprising a plate located on the opposite side of the charging passage from the ion generating means, and a power source connected to the plate for applying an AC voltage to the plate to periodically draw unipolar ions into the stream of aerosol particles in the passage through said porous means by an alternating low electric field established with the AC voltage supplied to the plate to impart a unipolar electric charge on substantially all the aerosol particles as they flow through the charging passage.

21. The apparatus of claim 20 wherein: the porous means is a screen connected to ground.

22. An apparatus for measuring aerosol particle concentration of an aerosol comprising: a charger having a charging passage and means for imparting a unipolar electric charge to aerosol particles moving through the charging passage without precipitating the aerosol particles, a particle separator having a separator passage in communication with the charger passage and an electrode rod extended along the longitudinal axis of the separator passage, a power supply connected to the electrode rod operable to provide the electrode rod with a voltage sufficient to precipitate charged aerosol particles smaller than a selected particle size, means including a filter for forming a sheath of moving clean air around said electrode rod, a charged particle collector for receiving the charged particles larger than the selected size, said collector having first means for gathering the charged particles and second means for measuring the electric charge of the gathered charged particles to determine aerosol particle mass concentration, and means for moving a sample of aerosol particle through the charger and separator into the collector.

References Cited

UNITED STATES PATENTS 3,114,877   12/1963   Dunham _____ 324—71

GERARD R. STRECKER, Primary Examiner

U.S. Cl. X.R.

324—71

PO-1050
(5/69)

UNITED STATES PATENT OFFICE
CERTIFICATE OF CORRECTION

Patent No. 3,526,828                     Dated September 1, 1970

Inventor(s) Kenneth T. Whitby

It is certified that error appears in the above-identified patent and that said Letters Patent are hereby corrected as shown below:

Column 2, line 29, "charger" should be --charge--.

Column 6, line 24, "charge" should be --charger--.

Column 6, line 27, "pasage" should be --passage--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents